(12) United States Patent
Cann et al.

(10) Patent No.: US 9,539,723 B2
(45) Date of Patent: Jan. 10, 2017

(54) ACCESSORY ROBOT FOR MOBILE DEVICE

(71) Applicant: Double Robotics, Inc., Sunnyvale, CA (US)

(72) Inventors: David Cann, Sunnyvale, CA (US); Marc DeVidts, Sunnyvale, CA (US); Alex Espinosa, Miami, FL (US); Paul Ventimiglia, Santa Clara, CA (US); Jay Liew, Sunnyvale, CA (US); Farhad Noorzay, Santa Clara, CA (US); Christopher Proia, Mountain View, CA (US)

(73) Assignee: Double Robotics, Inc., Burlingame, CA (US)

(*) Notice: Subject to any disclaimer, the term of this patent is extended or adjusted under 35 U.S.C. 154(b) by 54 days.

(21) Appl. No.: 14/205,994

(22) Filed: Mar. 12, 2014

(65) Prior Publication Data

US 2014/0277847 A1    Sep. 18, 2014

Related U.S. Application Data

(60) Provisional application No. 61/779,359, filed on Mar. 13, 2013.

(51) Int. Cl.
*B25J 5/00* (2006.01)
*B60L 3/00* (2006.01)
(Continued)

(52) U.S. Cl.
CPC .............. *B25J 5/007* (2013.01); *B60L 3/0061* (2013.01); *B60L 3/0084* (2013.01); *B60L 11/1803* (2013.01); *B60L 11/1805* (2013.01); *B60L 11/1816* (2013.01); *B60L 11/1864* (2013.01); *B60L 15/20* (2013.01); *B60L 15/2036* (2013.01); *B60L 2200/16* (2013.01); *B60L 2220/12* (2013.01); *B60L 2220/44* (2013.01); *B60L 2240/12* (2013.01); *B60L 2240/14* (2013.01); *B60L 2240/421* (2013.01); *B60L 2240/423* (2013.01); *B60L 2240/429* (2013.01); *B60L 2240/66* (2013.01); *B60L 2250/12* (2013.01); *B60L 2250/16* (2013.01); *B60L 2260/32* (2013.01); *B60L 2270/145* (2013.01); *Y02T 10/645* (2013.01); *Y02T 10/7005* (2013.01); *Y02T 10/7061* (2013.01); *Y02T 10/7072* (2013.01); *Y02T 10/72* (2013.01);
(Continued)

(58) Field of Classification Search
None
See application file for complete search history.

(56) References Cited

U.S. PATENT DOCUMENTS 2,926,927 A * 3/1960 Enright .................. B62B 3/009
                                                     224/426
6,292,713 B1  9/2001 Jouppi et al.
(Continued)

*Primary Examiner* — Truc M Do
*Assistant Examiner* — Jess Whittington
(74) *Attorney, Agent, or Firm* — Jeffrey Schox; Diana Lin

(57) ABSTRACT

A robot controllable by a portable device, the robot including a head configured to removably retain the portable device, a support removably mounted to the head, and a base mounted to the support, the base including a first wheel coaxially aligned with a second wheel and a balancing mechanism configured to maintain the head within a predetermined range of angular positions relative to a gravity vector based on instructions received from the portable device.

14 Claims, 10 Drawing Sheets

(51) Int. Cl.
 *B60L 11/18* (2006.01)
 *B60L 15/20* (2006.01)
(52) U.S. Cl.
 CPC ........ *Y02T 10/7275* (2013.01); *Y02T 10/7291* (2013.01); *Y02T 90/14* (2013.01); *Y02T 90/16* (2013.01)

(56) References Cited

U.S. PATENT DOCUMENTS

| | | | |
|---|---|---|---|
| 7,123,285 B2 * | 10/2006 | Smith | A47B 21/0073 348/14.05 |
| 7,593,546 B2 | 9/2009 | Jouppi | |
| 7,626,569 B2 | 12/2009 | Lanier | |
| 7,643,051 B2 | 1/2010 | Sandberg et al. | |
| 7,769,492 B2 | 8/2010 | Wang et al. | |
| 7,957,837 B2 | 6/2011 | Ziegler et al. | |
| 8,160,747 B1 | 4/2012 | Blackwell et al. | |
| 8,209,051 B2 | 6/2012 | Wang et al. | |
| 8,265,793 B2 | 9/2012 | Cross et al. | |
| 8,306,664 B1 * | 11/2012 | Wiley | B25J 5/007 280/304 |
| 8,442,661 B1 | 5/2013 | Blackwell et al. | |
| 8,788,096 B1 * | 7/2014 | Sokol | B25J 5/007 280/298 |
| 2007/0064092 A1 * | 3/2007 | Sandbeg | H04N 7/142 348/14.02 |
| 2008/0245594 A1 * | 10/2008 | Ishii | B62D 37/00 180/218 |
| 2011/0288684 A1 * | 11/2011 | Farlow | B25J 11/009 700/264 |
| 2014/0009561 A1 * | 1/2014 | Sutherland | B25J 5/007 348/14.05 |

* cited by examiner

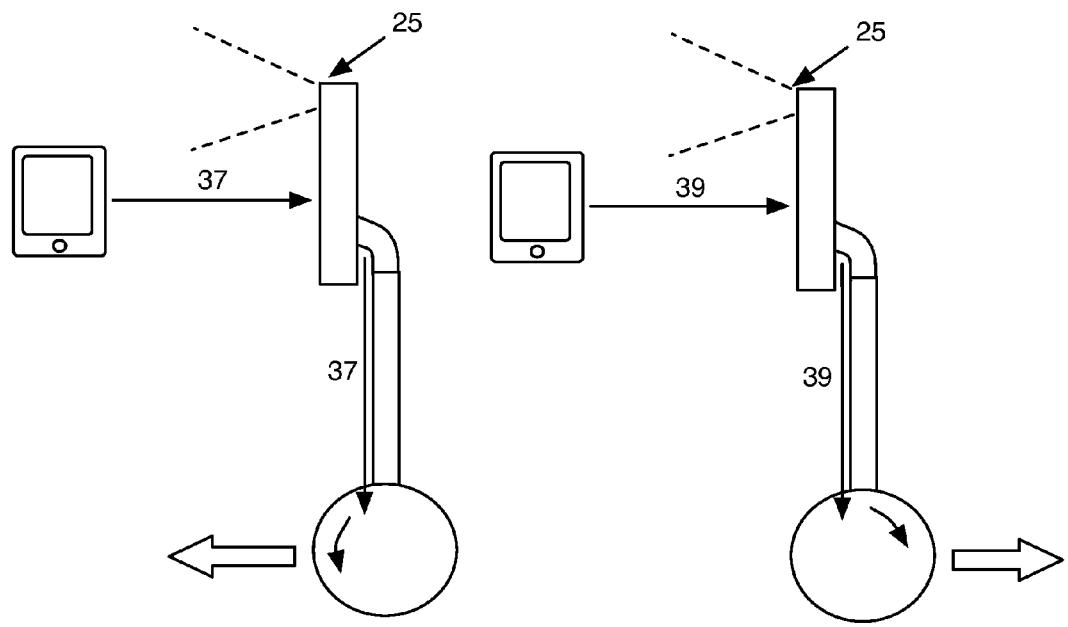
FIGURE 20A
FIGURE 20B
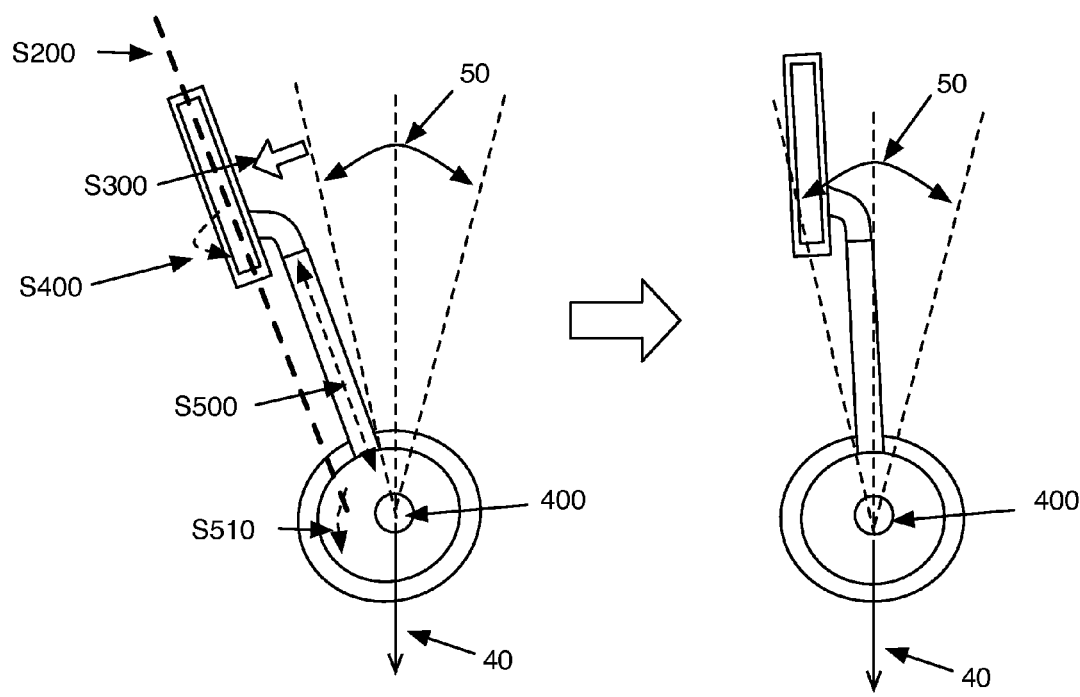
FIGURE 21A
FIGURE 21B

ACCESSORY ROBOT FOR MOBILE DEVICE

CROSS-REFERENCE TO RELATED APPLICATIONS

This application claims the benefit of U.S. Provisional Application No. 61/779,359 filed 13 Mar. 2013, which is incorporated in its entirety by this reference.

TECHNICAL FIELD

This invention relates generally to the robotics field, and more specifically to a new and useful telepresence robot in the robotics field.

BACKGROUND

Telepresence systems are becoming increasingly desirable with the increased employment of distributed teams and decreased cost of teleconference infrastructure. However, conventional telepresence systems are typically designed for static desktop applications, and are unsuitable for applications in which a remote user views and interacts with a variety of remote spaces. While telepresence robots do exist, conventional robots tend to be specialized in a given field and are unsuitable for consumer use. Furthermore, due to their specialization, conventional robots tend to be expensive, bulky, and laborious to update. Thus, there is a need in the telepresence field to create a new and useful robot suitable for consumer consumption.

BRIEF DESCRIPTION OF THE FIGURES

FIGS. 20A and 20B are schematic representations of a variation of the robot, operating in a second mode of operation, responding to a forward drive instruction and a reverse drive instruction, respectively.

FIGS. 21A and 21B are a schematic representation of the robot in an unbalanced state and a balanced state, respectively.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System.

Figure 1A:
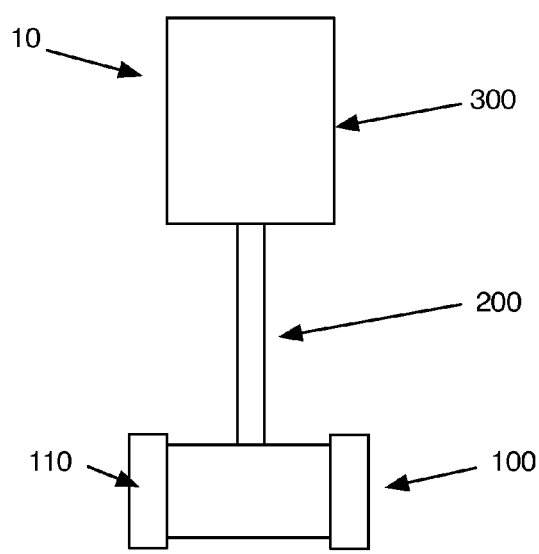
FIGS. 1A and 1B are schematic representations a front and side view of the robot, respectively.
Figure 1B:
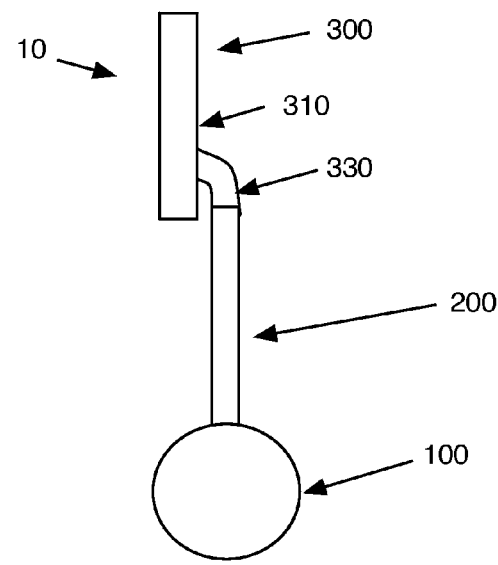

As shown in FIG. 1, the robot 10 includes a drive base 100, a support 200 mounted to the drive base 100, and a head 300 removably mounted to the support 200 and configured to transiently retain a mobile device 20. The mobile device preferably functions as the data output for the robot 10, and can additionally function as the data input for the robot 10. The retained device 20 can additionally control robot operation. The robot 10 functions to transport the retained device 20 within a physical location, such as a room, a building, or a field. The robot 10 additionally functions to maintain the mobile device orientation relative to a drive plane 60 that the robot drives upon. In some variations of the robot 10, the robot 10 is actively balanced.

Figure 2:
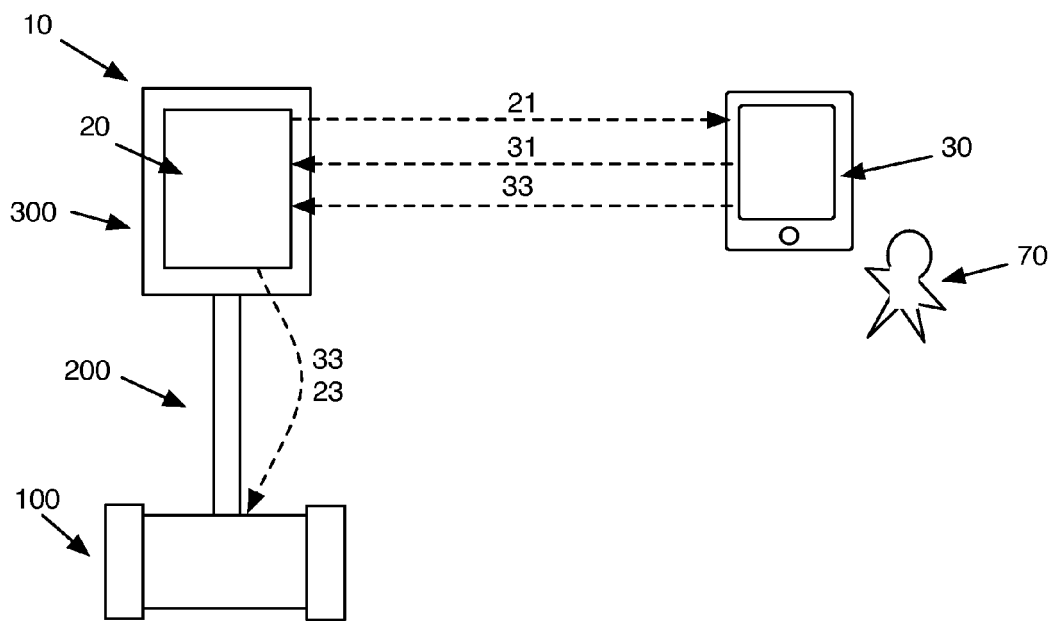
FIG. 2 is a schematic representation of data transfer between a retained device, a second device, and the robot.

The robot 10 is preferably remote-controlled, but can alternatively be automatically controlled (e.g., as a mobile kiosk), or otherwise controlled. More preferably, as shown in FIG. 2, the robot 10 is remote-controlled by a second device 30 acting through the retained device 20 (first device). The second device 30 is preferably also a mobile device (e.g., portable device, mobile computing device, etc.), but can alternatively be a static device, such as a desktop or mounted teleconference system. The second device 30 is preferably located remotely from the retained device 20, and is preferably connected to the retained device 20 through a network or any other suitable data connection. In operation, the retained device 20 captures and sends an audio and/or video stream 21 of the environment surrounding the robot 10 to the second device 30, wherein the audio and/or video stream 21 is displayed or played on the second device 30. The second device 30 can also capture and send an audio and/or video stream 31 to the retained device 20, wherein the audio and/or video stream 31 from the second device 30 is displayed or played on the retained device 20.

In one variation of the method, the retained device 20 captures a first and second audio and/or video stream from a first and second audio-video device, and sends the first and second audio and/or video stream to the second device 30. The second device 30 captures and sends a third audio and/or video stream to the retained device 20, which is subsequently displayed by the retained device 20. The first and/or second audio-video device (A/V devices) is preferably an A/V device of the retained device 20 (e.g., the front and back camera), but can alternatively be auxiliary AV devices mounted to the robot 10. The retained device 20 can additionally receive driving instructions 33 from the second device 30 (e.g., as received at the second device 30 from a user 70), wherein the retained device 20 can control the drive base 100 of the robot 10 to drive according to the received driving instructions. The retained device 20 can additionally determine the orientation of the retained device 20 relative to a reference vector 40 (e.g., gravity vector), and preferably controls the drive base 100 to substantially maintain the desired orientation of the retained device 20. The processor of the robot preferably generates balancing instructions 23 for the base based on the measurements from the retained device sensors, but the retained device 20 can alternatively generate balancing instructions 23 for the base based on measurements from sensors of the retained device 20, wherein the base maintains the head 300 and retained device 20 within a predetermined range of angular positions relative to a gravity vector based on the balancing instructions 23. Alternatively, any other suitable component can generate the balancing instructions 23. The retained device 20 can additionally receive height control instructions or a desired height parameter from the second device 30 (e.g., as received at the second device 30 from a user). The retained device 20 preferably controls the extension mechanism 210 of the robot 10 to adjust the overall length of the support 200 according to the height control instructions or to meet the desired height parameter, thereby adjusting the height or distance of the retained device 20 relative to the drive base 100. The retained device 20 can additionally measure ambient environment parameters and control the drive base 100 based on the parameter measurements. For example, the retained device 20 can record the ambient environment proximal the drive base 100 in a direction of travel, analyze the recording, and generate drive instructions based on the analysis. The robot 10 can be used in teleconference applications, remote monitoring applications, or in any other suitable application in which a remote-controlled information display and/or a data input device is desirable.

By leveraging a device that many users already own, a robot that functions as a mobile device accessory confers several benefits over conventional telepresence robots, particularly in the areas of cost and mobility through the reduction of part count. First, use of the mobile device as the data output eliminates the need for the robot 10 to include data outputs (e.g., a display). Likewise, use of the mobile device as the user input interface eliminates the need for the robot 10 to include user input interfaces. Second, by leveraging the mobile device processor, the number of control electronics contained within the robot 10 can be reduced. Third, by leveraging the sensors within the mobile device, the robot 10 can reduce or eliminate sensors used for balancing and navigation. Fourth, by facilitating head and/or mobile device removal and exchange, this robot enables easy hardware updates and flexibility across multiple mobile device platforms.

The mobile device supported by the robot 10 functions to control robot operation. The mobile device can additionally function as user input interface and as a data output device. The mobile device preferably includes a display that functions as a data output to a user. The display can be an LCD display, a plasma display, an e-ink display, a projector, or any other suitable display mechanism. The mobile device preferably additionally includes one or more environmental data devices that collect data on the robot 10's environment. The environmental data device is preferably a camera, but can alternatively be a light sensor, microphone, humidity sensor, location detector (e.g., GPS), or any other suitable sensor that collects environmental data. The mobile device can store the information collected by the environmental data. The mobile device can send the collected information to a secondary device (e.g., a secondary mobile device) and/or process the collected information into robot operation instructions (e.g., navigation instructions). The mobile device preferably includes one or more processors that function to generate and send robot operation instructions based on sensor measurements, operation instructions received from the secondary device, or any other suitable parameter. The processor(s) can additionally function to control the display and to receive and process any data inputs received at a user input interface. The mobile device preferably additionally includes a data transfer mechanism that functions to transfer and/or receive data from the drive base 100. The data transfer mechanism can additionally function to receive and/or transfer data from a secondary device. Alternatively, the mobile device can include a secondary data transfer mechanism that communicates with the secondary device. The data transfer mechanism can be a data port, a wireless data transmitter and/or receiver (e.g., Bluetooth, WiFi, ultrasound, infrared, inductive, etc.), or any other suitable data transfer mechanism. Data can be transferred to/from the drive base 100 through a wired connection, or can be sent and received through the wireless data transmitter and receiver. The mobile device can additionally include a user input interface that receives data input from a user. The user input interface can be a touchscreen, a button, a switch, or any other suitable input interface. The mobile device can additionally include orientation sensors that function to determine the orientation of the mobile device relative to a gravity vector. Orientation sensors can include accelerometers, gyroscopes, or any other suitable orientation sensor. The mobile device can additionally include a power input port electrically connected to an energy storage device of the mobile device (e.g., battery), wherein the power input port receives a connector and facilitates battery charging. The power input port can be the same port as the data port. The mobile device preferably has a substantially symmetric form factor along the longitudinal and lateral axes, but can alternatively be asymmetric. The mobile device is preferably a tablet, but can alternatively be a laptop, a smartphone, a digital notepad, or any other suitable mobile device.

The mobile device preferably has a substantially rectangular prismatic form factor with a first and second opposing broad face, each broad face having a first and a second opposing longitudinal edge connected by a first and second opposing lateral edge. A touchscreen (e.g., capacitive or resistive) is preferably overlaid on (or located under) a display located on the first broad face, but the mobile device can alternatively include any other suitable data input, such as a keyboard or buttons, or not include a data input mechanism. A front-facing camera 25 is preferably located along a lateral edge of the first broad face, and is preferably centered along the lateral edge. However, the front-facing camera 25 can be arranged along a longitudinal edge of the mobile device. The mobile device preferably additionally includes a back-facing camera arranged on the second broad face. The back-facing camera is preferably located in a corner of the second broad face, but can alternatively be located along a longitudinal or lateral edge. However, the mobile device could not include any cameras. In one variation of the mobile device, the mobile device is a tablet (e.g., an Apple iPad). In another variation of the mobile device, the mobile device is a smartphone.

As shown in FIG. 1, the drive base 100 of the robot 10 functions to move the robot 10 about a space. The drive base 100 preferably additionally functions to carry the support 200. The drive base 100 preferably additionally functions to maintain a desired orientation of the mobile device retained in the head 300 (e.g., via active balancing). The drive base 100 is preferably capable of moving the robot 10 in a first direction and a second direction opposing the first direction, wherein the first and second directions are preferably perpendicular to the rotational axis of the wheels 110. The drive base 100 can additionally be capable of turning the robot 10 (e.g., moving the robot 10 at an angle between the first and second directions). However, the drive base 100 can move the robot 10 in any other suitable manner.

Figure 3:
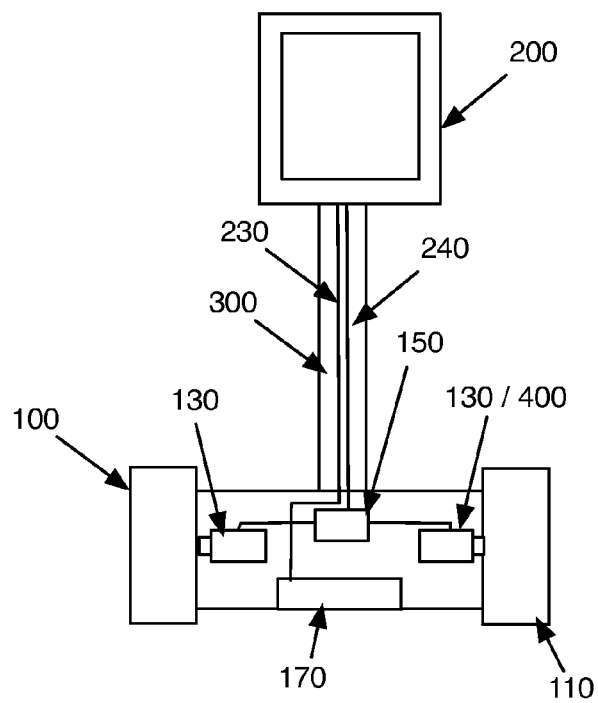
FIG. 3 is a schematic representation of a variation of the robot including a drive mechanism, a primary controller, and a power source.

As shown in FIG. 3, the drive base 100 preferably includes a wheel 110 and a drive mechanism 130 connected to the wheel 110. More preferably, the drive base 100 includes two wheels 110 coaxially arranged, but can alternatively include any suitable number of wheels no in any suitable configuration. Each wheel 110 can additionally include a conductive element, such as a conductive hub or spoke, that is electrically connected to a power source 170 supported by the base. The conductive element can function as a charging contact for the power source 170.

The drive mechanism 130 preferably includes a motor and a force transfer mechanism that transfers the force generated by the motor to the wheel no. The motor is preferably an electric motor (e.g., AC motor, DC motor, induction motor, linear motor, etc.), but can alternatively be a pneumatic motor or any other suitable motor. The force transfer mechanism is preferably a drive belt connected to the shaft of the motor, but can alternatively be a drive shaft or any other suitable force transfer mechanism. The force transfer mechanism can additionally include a gearbox. Alternatively, the motor can be directly connected to the wheel 110. The motor can additionally include an encoder, a current sensor, or any other suitable sensor that provides information indicative of motor operation. The robot 10 preferably includes one drive mechanism 130 connected to each wheel 110, but can alternatively include one drive mechanism 130 for each pair of wheels 110, or have any other suitable configuration. The robot 10 preferably additionally includes a motor controller that controls motor operation. Motor operation is preferably controlled based on control instructions received from the mobile device, but can alternatively be controlled based on control instructions received from a processor within the drive base 100. Each motor preferably includes a motor controller, but a single motor controller can control multiple motors. The robot 10 can additionally include a primary controller (primary processor 150) that controls the one or more motor controllers based on instructions received from the retained device 20. The primary controller is preferably supported by the drive base 100, but can alternatively be supported by the support 200, head, or any other suitable robot component. Alternatively, the motor controllers can directly receive control instructions from the retained device 20 or the second device 30.

Figure 4:
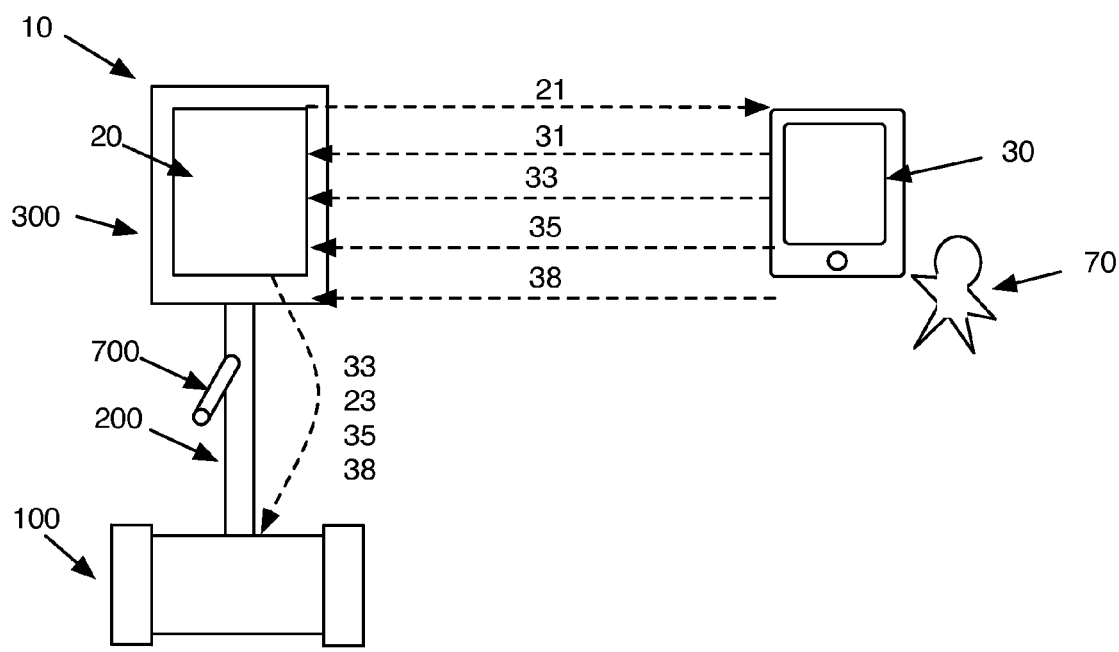
FIG. 4 is a schematic representation of a variation of data transfer between the retained device, the second device, and the robot.

As shown in FIG. 1, the support 200 of the robot 10 functions to support the head 300 of the robot 10 and to connect the head 300 to the drive base 100. The support 200 is preferably a pole arranged with the longitudinal axis perpendicular to the rotational axis of the drive base 100, but can alternatively have any other suitable form or configuration. The support 200 is preferably removably mounted to the head 300 at a first end, and is preferably statically mounted to the drive base 100 at a second end. Alternatively, the support 200 can be statically mounted to the head 300 at the first end or removably mounted to the drive base 100 at the second end. The overall length (e.g., height) of the support 200 is preferably adjustable. The support height is preferably adjustable between 3 ft and 5 ft (e.g., between 47 inches and 59 inches), but can alternatively be adjustable between any suitable length. The support height adjustment is preferably active (e.g., driven), but can alternatively be manually adjustable. The apparent length of the support 200 (e.g., support height) is preferably controlled based on extension instructions (e.g., height instructions 35) received from the retained device 20, but can alternatively be controlled based on extension instructions received from the second device 30 (as shown in FIG. 4), measurements of the ambient environment, parameters derived from video analysis (e.g., adjusted to center the face of a subject in the field of view of a camera of the retained device 20), or adjusted based on any other suitable instruction.

Figure 5:
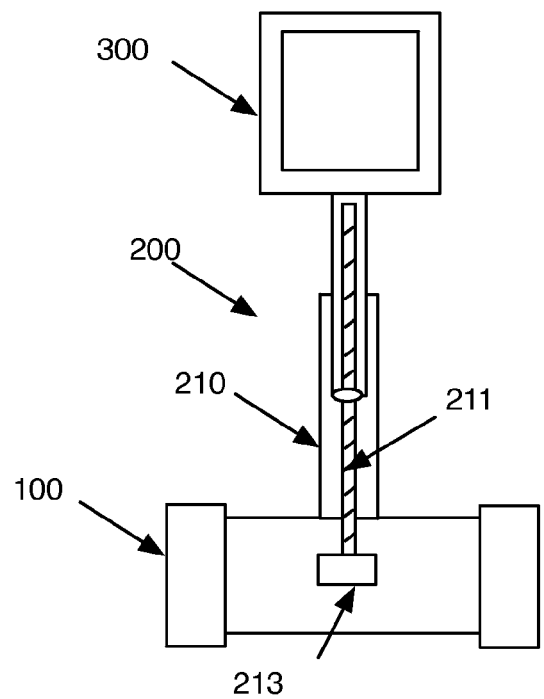
FIG. 5 is a schematic representation of a variation of the robot having an extension mechanism as a support.

As shown in FIG. 5, the support 200 preferably includes an extendable member (e.g., extension mechanism 210), more preferably a telescoping pole, but can alternatively include sections that fold out and up to increase the overall pole length or have any other suitable form factor that enables support height adjustment. The support 200 preferably includes an extension mechanism 210 that adjusts the height of the support 200. The extension mechanism 210 is preferably a linear actuator 211 operable between an actuating mode and a standby mode, but can alternatively be any other suitable mechanism. The linear actuator 211 can be a mechanical actuator (e.g., screw, wheel 110 and axle, cam, etc.), hydraulic actuator, pneumatic actuator, piezoelectric actuator, electro-mechanical actuator, linear motor, telescoping linear actuator 211, or any other suitable actuator. Specific examples of actuators that can be used include a leadscrew, screw jack, ball screw, and rack and pinion. The linear actuator 211 preferably moves at a substantially constant speed when in the actuating mode (e.g., 1000 rpm, 500 rpm, etc.), but can alternatively move at varying speeds. The drive components 213 (e.g., motor, pump, etc.) of the extension mechanism 210 are preferably located in the drive base 100, while the extending member (e.g., the leadscrew) is arranged within the support 200, more preferably along the longitudinal axis of the support 200 but alternatively along any other suitable portion of the support 200. However, the drive components 213 and extending member of the extension mechanism 210 can alternatively be located elsewhere on the robot 10. The drive components 213 of the extension mechanism 210 are preferably controlled by the primary controller (e.g., primary processor 150), but can alternatively be controlled by a separate processor. The support 200 can additionally include a head interface 230 at the first end that mounts the head 300 to the support 200. The head interface 230 is preferably complimentary to the support interface 330 of the head 300 (e.g., includes complimentary coupling mechanisms 233 and/or alignment mechanisms 231).

Figures 19A, 19B:
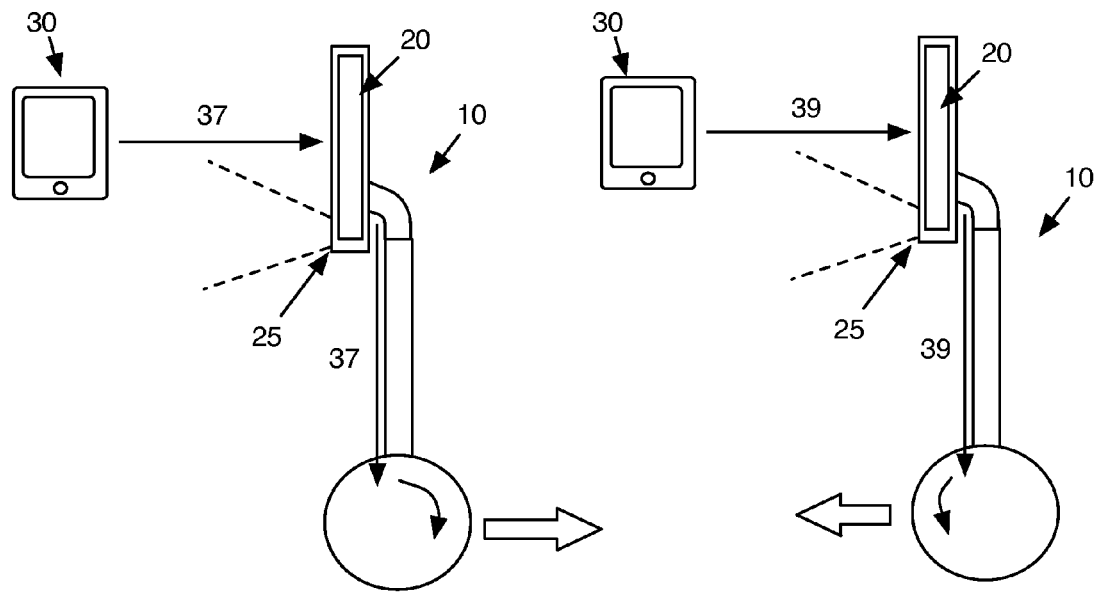
FIGS. 19A and 19B are schematic representations of a variation of the robot, operating in a first mode of operation, responding to a forward drive instruction and a reverse drive instruction, respectively.

As shown in FIG. 1, the head 300 of the robot 10 functions to receive and retain the mobile device. The head 300 of the robot 10 additionally functions to couple the mobile device to the support 200. The head 300 preferably receives the retained device 20 in a first orientation (e.g., as determined by the placement of the camera or another feature that renders the mobile device asymmetric along a longitudinal or lateral axis). However, the head 300 can receive the mobile device in both a first and a second orientation, wherein the first orientation preferably triggers a first robot operation mode and the second orientation preferably triggers a second robot operation mode. For example, when the head 300 retains the device 20 with the front-facing camera 25 proximal the drive base 100 (first orientation), the robot 10 preferably drives in a direction normal to the first broad face of the mobile device (e.g., the broad face including an aperture for the front-facing camera 25 or the broad face supporting the front-facing camera 25) when a forward advancement instruction 37 is received, and drives in a direction normal to the second broad face of the mobile device 20 in response to a reverse instruction 39 (first operation mode, as shown in FIGS. 19A and 19B). When the head 300 retains the mobile device with the front-facing camera 25 distal the drive base 100 (second orientation), the robot 10 preferably drives in a direction normal to the second broad face of the mobile device when a forward advancement instruction 37 is received, and drives in a direction normal to the second broad face of the mobile device 20 in response to a reverse instruction 39 (second operation mode, as shown in FIGS. 20A and 20B). However, the head 300 can receive the device 20 in any suitable orientation. The head 300 is preferably substantially static relative to the support 200, but can alternatively articulate relative to the support 200. In the latter variation, the robot 10 preferably includes an articulation mechanism, such as a motor controlling head articulation about a joint (e.g., slide joint, rotary joint, ball joint, cam joint, etc), a wire extending through the support 200 connected to a winding motor, an electromagnet configured to generate an attractive and/or repulsive force on a ferrous element coupled to the head 300, or any other suitable articulation mechanism. The articulation mechanism is preferably mounted to the support 200, wherein the articulation mechanism couples the head 300 to the support 200 or is arranged between the head 300 coupling mechanism of the support 200 and the base. The articulation mechanism can alternatively be mounted to the head 300 and removably couplable to the support 200. The head 300 preferably articulates by rotating about the longitudinal axis of the support 200, but can alternatively articulate by rotating about a vector perpendicular to the longitudinal axis of the support 200, or by articulating in any other suitable manner. The head 300 preferably couples to the support 200 such that a broad face of the device retention mechanism 310 is parallel to the drive axis of the drive base 100, but can alternatively couple to the support 200 such that the broad face of the device retention mechanism 310 is parallel to the longitudinal axis of the support 200, or couple to the support 200 in any other suitable configuration.

The head 300 preferably includes a device retention mechanism 310 that functions to receive and retain the mobile device 20. The device retention mechanism 310 is preferably unique to the mobile device form factor, but can alternatively be substantially universal and accommodate multiple mobile device form factors (e.g., be adjustable). The device retention mechanism 310 preferably retains the corners of the mobile device 20, but can additionally retain the lateral and/or longitudinal edges of the mobile device 20, retain the mobile device 20 along a broad face, or retain any other suitable portion of the mobile device 20. The device retention mechanism 310 preferably includes a cutout or lumen 311 that permits the mobile device display to be viewed. The device retention mechanism 310 can additionally include sensor cutouts 313 arranged such that the holes align with the environmental data sensors (e.g., cameras). The device retention mechanism 310 can additionally include cutouts that permit access to auxiliary mobile device ports (e.g., data ports, etc.). The device retention mechanism 310 can additionally include attachment mechanisms (e.g., magnets, hooks, clips, etc.) adjacent the camera cutouts that removably couple camera accessories (e.g., different lenses, filters, etc.) to the camera. The device retention mechanism 310 is preferably hard, but can alternatively be soft. The device retention mechanism 310 can be a sleeve, a set of straps (e.g., that retain the mobile device corners), or be any other suitable device retention mechanism 310.

Figure 6A:
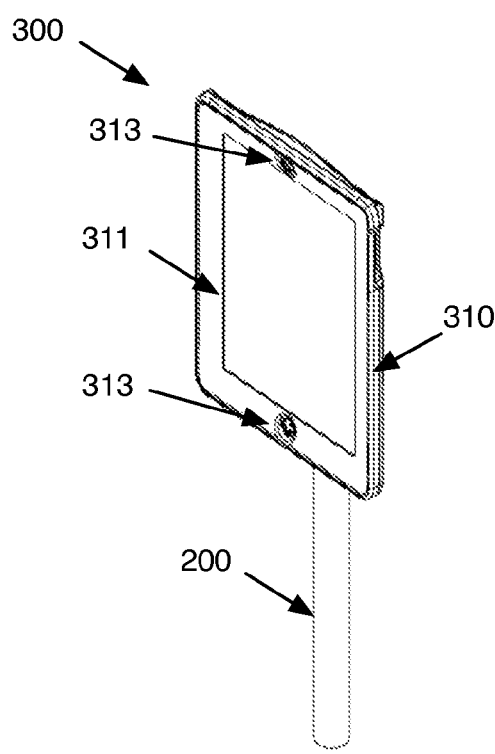
FIGS. 6A and 6B are perspective views of the front and back of a variation of the head, respectively, wherein the head includes a navigation mechanism configured to redirect an image of an area adjacent the drive base to the back-facing camera of the mobile device.
Figure 6B:
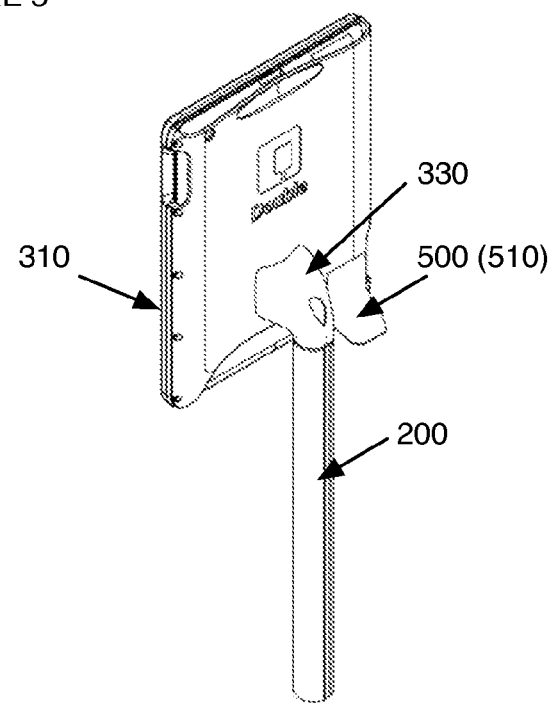

In one variation of the head 300, as shown in FIGS. 6A and 6B, the device retention mechanism 310 substantially traces the profile of the mobile device 20, such that the device retention mechanism 310 supports the mobile device 20 along the first and second broad face. More preferably, the device retention mechanism 310 has a first and a second plate arranged with the broad faces adjacent and parallel. The first plate preferably includes frame that retains the broad device along a first and second opposing edge of the mobile device. More specifically, the first plate preferably includes a cutout 311 (e.g., lumen), such that the first plate defines a device retention frame including a first and second opposing longitudinal edge connected by a first and second opposing lateral edge. However, the first place can include only a first and second opposing longitudinal edge, a first and second opposing lateral edge, or have any other suitable configuration. In operation, the first plate preferably supports the first broad face of the mobile device along the lateral and longitudinal edges. The first plate of the device retention mechanism 310 preferably additionally includes a first and second cutout for the front-facing camera 25 located along the first and second lateral edges, respectively, such that the head 300 can support the mobile device in a first and second orientation. The second plate of the device retention mechanism 310 is preferably substantially solid, but can alternatively be substantially identical to the first plate or have any other suitable configuration. The second plate can additionally include a cutout for the back-facing camera, more preferably two cutouts arranged in opposing corners (e.g., to accommodate for a camera located in the corner of a mobile device). The device retention mechanism 310 preferably additionally includes an opening along a lateral edge, more preferably the lateral edge distal the support interface 330, which receives the mobile device. In another variation of the head 300, the device retention mechanism 310 preferably includes a backplate and a first, second, third, and fourth retaining straps arranged at the corners of the backplate, wherein the first, second, third, and fourth retaining straps are configured to retain the first, second, third, and fourth corners of the retained device 20. However, the head 300 can include any other suitable device retention mechanism 310.

Figure 7:
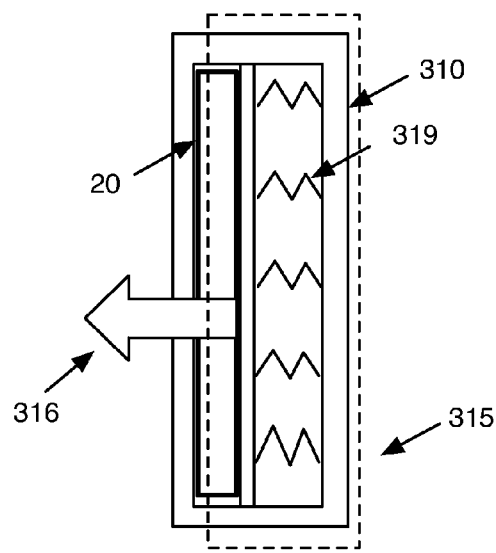
FIG. 7 is a cutaway view of a variation of the head including a force application mechanism.

The device retention mechanism 310 can additionally include a force application mechanism 315. The force application mechanism 315 can function to apply a stabilizing force 317 on the retained device 20 against the first plate. Alternatively, the force application mechanism 315 can function as a damping system to dampen mechanical vibrations on the retained device 20. The force application mechanism 315 can be a singular piece of material (e.g., covering the entirety of the broad face of the second plate proximal the first plate), multiple pieces of material, or have any other suitable configuration. The force application mechanism 315 can include foam, rubber, or any other suitable material. In one variation of the robot 10, as shown in FIG. 7, the force application mechanism 315 includes a plate, substantially the dimension of the broad face of the retained device 20, coupled to the broad face of the second plate proximal the first plate with one or more damping elements 319. The damping elements 319 can include damping cones, springs, foam, rubber, a combination thereof, or any other suitable stabilizing element.

The head 300 can additionally include a support interface 300 that functions to removably mount the head 300 to the support 200. The support interface 330 preferably extends from a lateral edge of the device retention mechanism 310, but can alternatively extend from another portion of the device retention mechanism 310. The support interface 330 is preferably standardized between heads having different device retention mechanisms 310, such that the same coupling mechanism can couple all head variations to the same standardized support. However, the support interface 330 can be different for each device retention mechanism 310. The support interface 330 preferably includes a coupling mechanism that couples the device retention mechanism 310 to the support 200. The coupling mechanism is preferably a screw, but can alternatively be a clip, adhesive, hooks, magnetic element, or any other suitable coupling mechanism. The support interface 330 preferably extends from a lateral edge of the device retention mechanism 310, but can alternatively extend from a longitudinal edge, a corner, a broad face, or any other suitable portion of the device retention mechanism 310. The support interface 330 is preferably manufactured as an integral piece with the device retention mechanism 310, but can alternatively be manufactured as a separate piece and assembled to the device retention mechanism 310. The support interface 330 preferably includes an alignment mechanism 331, and is preferably asymmetric (e.g., includes a key, groove, or other alignment feature), such that the support interface 330 can couple to the complimentary head interface 230 on the support 200 in a single orientation. However, the support interface 330 can be substantially symmetric or couple to the head interface 230 in any other suitable number of orientations.

Figure 8:
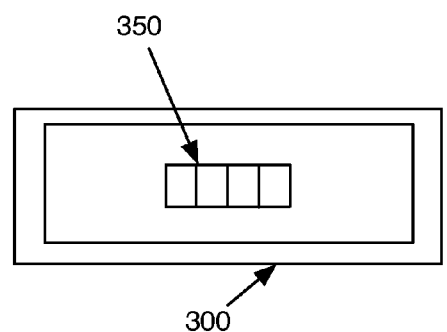
FIG. 8 is a top-down view of a variation of the head including a device connector.

The robot 10 can additionally include a device connector 350 (e.g., communication mechanism) that electrically connects to the data and/or power port of the mobile device. The device connector 350 is preferably arranged in the head 300, as shown in FIG. 8, but can alternatively be arranged in the base. The device connector 350 can be a data connector, a power connector, a power and data connector, an auxiliary device connector that electrically connects an auxiliary device to the retained device 20 and transmits power and/or data between the auxiliary device and retained device 20, or be any other suitable device connector 350. The device connector 350 is preferably arranged proximal the support interface 330, within a retaining lumen defined by the device retention mechanism 310, but can alternatively be arranged along an edge of the head 300 opposing the support interface 330, along an edge of the head 300 adjacent the support interface 330 edge, along a broad face of the head 300, or arranged in any other suitable configuration. The device connector 350 is preferably a wired connector, but can alternatively be a wireless connector. In one variation, the device connector 350 is a power and data connector, such as a USB connector, Lightning™ connector, 30-pin connector, or Thunderbolt' connector. The device connector 350 can be incorporated into the head 300, or be a removable connector or cable. In another variation, the device connector 350 is a wireless inductive power charger that functions to charge the device. The inductive charger can additionally transmit data from the robot 10 to the device, and/or receive data from the retained device 20. In another variation, the device connector 350 is a wireless receiver, such as a Bluetooth, NFC, or other short-range data connection configured to receive instructions from the retained device 20. When the device connector 350 is arranged in the head 300, the device connector 350 can transmit the received instructions via a wireless connection to the base or via a wired connection to the base, wherein the wired connection preferably extends through a lumen in the support 200 but can alternatively extend along an exterior portion of the support 200.

In variations of the robot 10 including a device connector 350 arranged in the head 300, the support interface 330 of the head 300 can additionally include a support connector 370 that functions to connect the device connector 350 to data and/or power connections within the support 200. The support connector 370 can additionally function to apply a coupling force to the support 200, such that the support connector 370 can additionally function as the coupling mechanism. The support connector 370 is preferably arranged at the support interface 330, such that coupling the head 300 to the support 200 additionally connects the device connector 350 to the data and/or power connections within the support 200, but can alternatively be arranged elsewhere. In one variation, the support connector 370 includes one or more planar, electrically conductive contacts that mechanically couple to complimentary contacts on the support 200. In another variation, the support connector 370 includes a male or female connector and the support 200 includes the complimentary male or female connector. In another variation, the support connector 370 and device connector 350 are paired of wireless receivers and transmitters. In another variation, the support connector 370 and device connector 350 are inductive elements.

Figure 9:
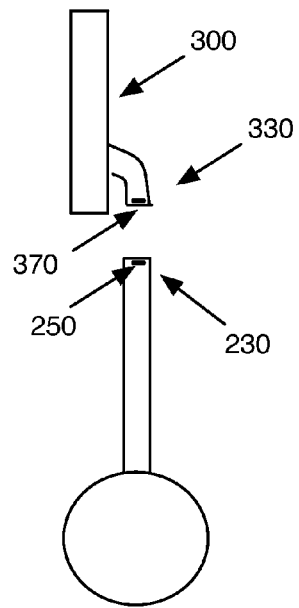
FIG. 9 is a side view of a variation of the robot with the head detached from the support, wherein the head includes a support connector and the support includes a head connector.
Figure 10A:
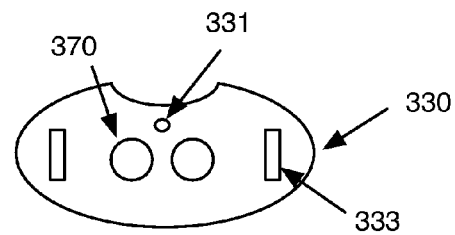
FIGS. 10A and 10B are end views of a variation of a support interface of the head and the complimentary device interface of the support.
Figure 10B:
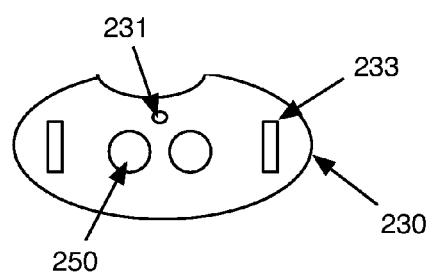

In these variations, the support 200 can additionally include a head connector 250 that electrically connects to the support connector 370, wherein the head connector 250 and support connector 370 preferably exchange data and/or power, examples of which are shown in FIGS. 9, 10A, and 10B. The head connector 250 is preferably arranged in the head interface 230, but can alternatively be arranged proximal the first end of the support 200 or arranged at any other suitable position on the support 200. The support 200 can additionally include wires extending through the support interior, from the drive base 100 to the head connector 250. In one specific example, the power wire 230 and/or data wire 240 extends through a lumen defined along the longitudinal axis of the support 200 (e.g., through the center of the screw defining the linear actuator 211). In another example, the wire extends through a space extending parallel to and offset from the longitudinal axis. However, the wires can alternatively extend from the head interface 230 to any other suitable portion of the robot 10. The wires preferably have an adjustable apparent length to accommodate the support length adjustments. The wires can have substantially elastic properties (e.g., be made of an elastic material, be woven, etc.), or can have a substantially static overall length but be arranged in an extendable (and contractible) configuration, such as being wound in a coil about the axis of support extension. The first end of the wire is preferably connected to the head connector 250. The second end of the wire can be connected to the primary controller, a sensor, or any other suitable data component, particularly when the head connector 250 includes data functionality. The second end of the wire can alternatively or additionally be connected to the power source 170.

However, the wire can alternatively connect a sensor on the robot 10 to the data connector, or connect any other suitable robot component to the data connector. When the head connector 250 is a power connector, the wire preferably extends from the first end of the support 200 to electrically connect with a power source 170, wherein the power source 170 is preferably arranged within the drive base 100 (e.g., between the first and second wheels no) but can alternatively be arranged within the support 200 or in any other suitable portion of the robot 10.

The robot 10 can additionally include a receiver and/or transceiver that functions to wirelessly send and receive instructions sent by the mobile device, and can additionally include a transmitter that sends drive base operation parameters (e.g., motor operation parameters, etc.) to the mobile device. The receiver and/or transceiver is preferably supported by the drive base 100, but can alternatively be supported by the support 200 or the head 300. Alternatively, the robot 10 can have a wired data connection to the mobile device extending through the support 200 and head. The drive base 100 can additionally include sensors that facilitate active balancing and/or driving, such as accelerometers, gyroscopes, or any other suitable sensor. The support 200 preferably mounts to the drive base 100 at a point equidistant from the wheels 110, but can alternatively be offset from this centerpoint. The drive base 100 can additionally include a casing that encapsulates and mechanically protects the electrical components of the drive base 100. The wheels no preferably rotate relative to the casing and enclosed components, but can alternatively rotate with the casing and enclosed components.

The robot 10 can additionally include a balancing mechanism 400 that functions to maintain balance of the robot 10 on the first and second wheels 110. The balancing mechanism 400 is preferably arranged within the drive base 100, but can alternatively be arranged within the support 200 or the head 300. The balancing mechanism 400 preferably maintains the head 300, mobile device, first end of the support 200, longitudinal axis of the support 200, or any other suitable robot component within a predetermined range of positions 50 relative to a gravity vector. Alternatively, the balancing mechanism 400 can maintain the robot component within a predetermined range of positions 50 relative to a vector intersecting a point of first and/or second wheel 110 contact with a driving surface 60 and the rotational axis of the respective wheel 110.

Figure 11A:
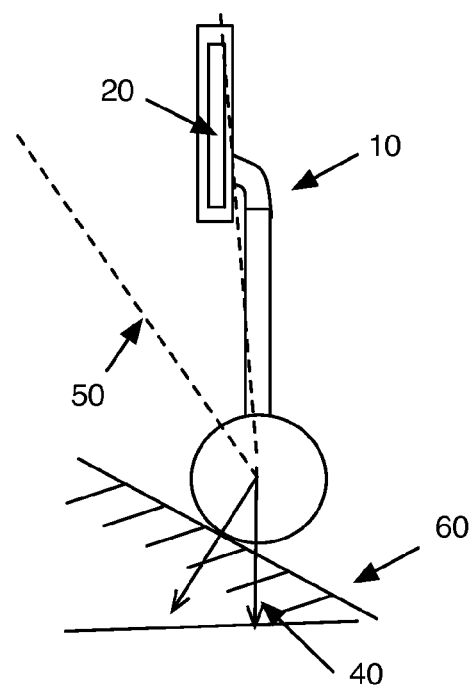
FIGS. 11A, 11B, and 11C are schematic representations of a first, second, and third example of position ranges, respectively.
Figure 11B:
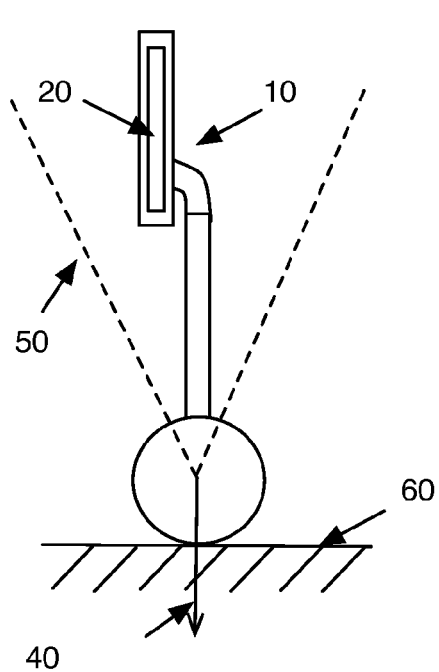
Figure 11C:
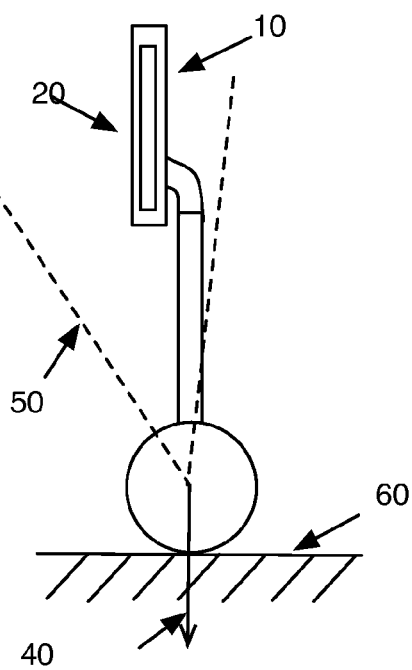

The range of positions 50 is preferably a range of angles, but can alternatively be a distance between the head 300 and a rotational axis of the wheel 110, or any other suitable range of positions 50. The range of positions 50 is preferably determined by the retained device 20, but can alternatively be received from the second device 30 or otherwise determined. For example, the range of positions 50 can be determined from the driving velocity or acceleration of the base, be determined based on the geographic location of the robot 10 (e.g., location in a building, type of business, etc.), the distance between the head 300 and the base, an identifier for the head 300 (e.g., as determined from a unique connector, a short-range and/or passive identification tag, etc.), image analysis (e.g., the position of a subject in the field of view of a mobile device camera), the incline angle o the drive surface (e.g., as shown in FIG. 11A), or based on any other suitable robot operation parameter. The predetermined angular range is preferably centered about a vector parallel to the gravity vector (e.g., within a 20° range centered about the gravity vector), as shown in FIG. 11B, but can alternatively be a range measured from the gravity vector (e.g., between 0°-20° in the direction normal to the display of the retained device 20), be a range including the gravity vector (e.g., a range unevenly distributed about a gravity vector, as shown in FIG. 11c), or be any other suitable angular range. The balancing mechanism 400 preferably balances the robot 10 based on instructions received from the retained device 20, but can alternatively balance the robot 10 based on instructions received from the second device 30, based on measurements from sensors on-board the robot 10 (e.g., in the drive base 100, support, or head), or based on any other suitable balancing instructions 23. The balancing mechanism 400 is preferably operable between an active mode and a standby mode. The balancing mechanism 400 is preferably fully powered in the active mode, and has a decreased response rate or draws less power in the standby mode. The balancing mechanism 400 preferably actively controls the base to balance the head 300 in the active mode, and can be shut off or powered down, such that the balancing mechanism 400 does not actively balance the head 300 in the standby mode. However, the balancing mechanism 400 can alternatively be operable in any other suitable mode having any other suitable power or response characteristics.

The balancing mechanism 400 is preferably the drive mechanism 130, wherein a primary controller (e.g., processor) receives and controls the drive mechanism 130 to regain support and/or head positioning within the predetermined range. In one variation, the motor controller or a processor controlling the motor controller receives the balancing instructions 23 and controls a motor to move the wheel 110 to regain the desired position. However, the drive mechanism 130 can be otherwise used to maintain the robot 10 balance. The balancing mechanism 400 can alternatively be a gyroscope rotating within a plane perpendicular to the wheel 110 rotational axis, parallel to the wheel 110, or parallel to the wheel 110 rotational axis and intersecting the wheels no. The balancing mechanism 400 can alternatively be an inverted pendulum. However, the robot 10 can alternatively include any other suitable balancing mechanism 400.

Figure 12A:
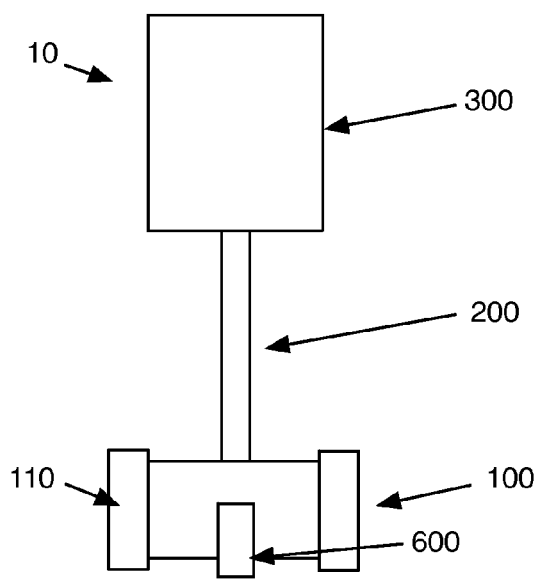
FIGS. 12A and 12B are schematic representations of a front and side view of a variation of the robot including stands, respectively.
Figure 12B:
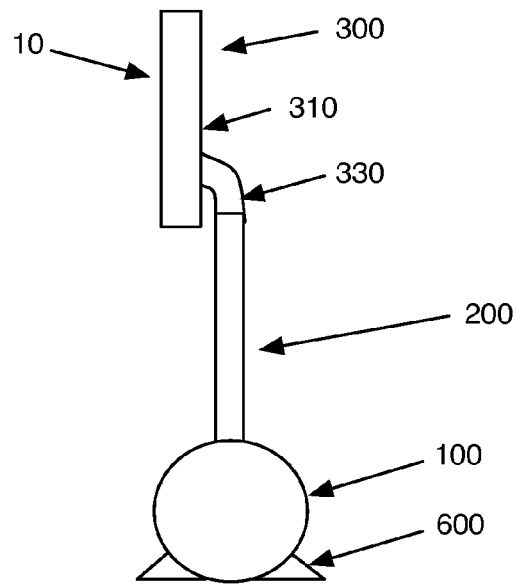

As shown in FIGS. 12A and 12B, the robot 10 can additionally include one or more stand 600s (e.g., kickstand) that function to maintain the mobile device orientation when the drive base 100 is turned off or in a standby mode. The stand 600 preferably accomplishes this by maintaining the drive base 100 angular position, but can alternatively accomplish this in any other suitable manner. The stand 600 preferably maintains the robot 10 balance by contacting the drive surface and supporting the robot 10 against the drive surface, but can alternatively contact any other suitable static surface to maintain the robot 10 balance or position. The stand 600 is preferably movably mounted to the drive base 100, but can alternatively be supported by the support 200 or head. More preferably, the stand 600 is rotatably mounted to the drive base 100, but can alternatively be extendably mounted, translationally mounted, or otherwise mounted to the drive base 100. The extent of stand 600 extension is preferably substantially constant, but can alternatively vary based on the predetermined position range 50 or the last position of the retained device 20 at the time of stand 600 extension instruction receipt. For example, the amount or degree of stand 600 extension can be adjusted to maintain the retained device 20 in the last position. The drive base 100 preferably includes a first and a second stand 600 extending from the drive base 100 on either side of a plane extending along the rotational axis of the drive base 100 and a gravitational vector, as shown in FIG. 4. The first and second stand 600 are preferably symmetrically arranged on either side of this plane, but can alternatively be asymmetrically arranged. Alternatively, the drive base 100 can include one stand 600 or any suitable number of stands 600. Each stand 600 is preferably operable in a retracted mode wherein the stand 600 is retracted from the ground, and an extended mode wherein the stand 600 contacts the ground and prohibits support and head motion relative to a gravity vector.

The stand 600 preferably extends by rotating from a first position relative to the drive base 100 or support to a second position relative to the drive base 100 or support, but can alternatively telescope (e.g., change apparent length) or otherwise transition between the retracted and extended modes. The stand 600 is preferably extended from the retracted mode to the extended mode, and retracted from the extended mode to the retracted mode. The speed of stand retraction and/or extension is preferably substantially constant, but can alternatively be variable based on the geographic location of the robot 10, control instructions received from the second device 30, ambient environment parameters (e.g., wind speed), sensor measurements (e.g., the stand 600 will extend faster if the retained device 20 is falling or accelerating along the gravity vector faster than the acceleration of gravity), the experience of a user (or user account) controlling the second device 30 (e.g., the total number of hours the user has controlled the robot 10, etc.), the translation speed of the robot 10, the rotational speed of the wheels 110 (e.g., based on the encoder), or based on any other suitable parameter. The speed of stand retraction is preferably the same as the speed of stand 600 extension, but can alternatively be faster or slower.

Figure 13:
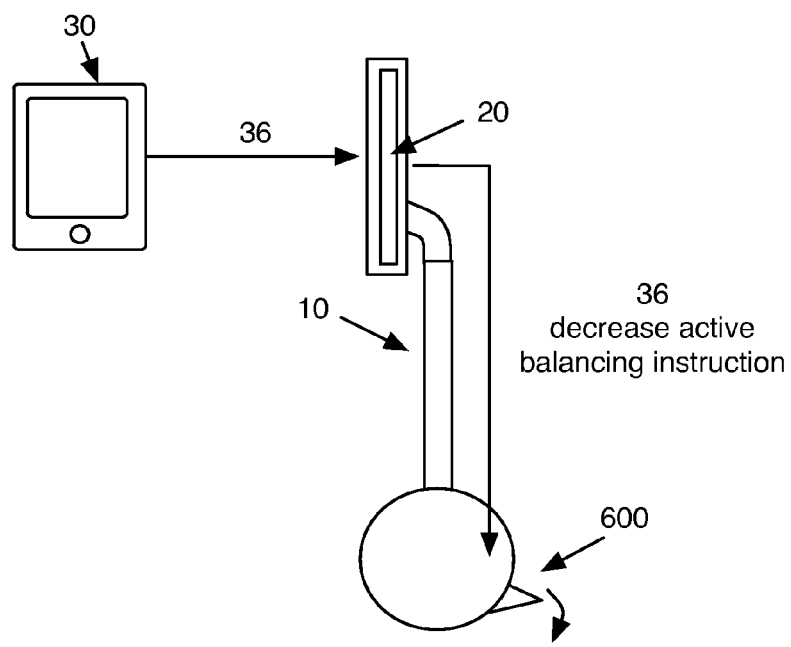
FIG. 13 is a schematic representation of a variation of robot operation in response to receipt of a standby mode instruction from the second device.

The stand 600 is preferably extended in response to an extension instruction received from the retained device 20, but can alternatively be extended in response to an extension instruction (e.g., a standby mode instruction 37) received from the second device 30 (as shown in FIG. 13, extension instructions generated by the primary controller, or extended in response to extension instructions generated by any other suitable component. The extension instructions are preferably generated in response to receipt of a park or extension command received from the second device 30. However, the extension instructions can alternatively be generated in response to determination of a park trigger event, such as the time duration since the last drive command was received reaching or surpassing a predetermined time threshold, determination of a fault in the drive mechanism 130, determination that the robot 10 has docked to a charging station, or in response to any other suitable trigger event.

The stand 600 is preferably retracted in response to a retraction instruction received from the retained device 20, but can alternatively be retracted in response to a retraction instruction received from the second device 30, a retraction instructions generated by the primary controller, or retracted in response to retraction instructions generated by any other suitable component. The retraction instructions are preferably generated in response to receipt of a drive or retraction command received from the second device 30. However, the retraction instructions can alternatively be generated in response to determination of a drive trigger event, such as receipt of an upsetting force (e.g., the support 200 was pushed by an external force), or in response to any other suitable trigger event.

Figure 14:
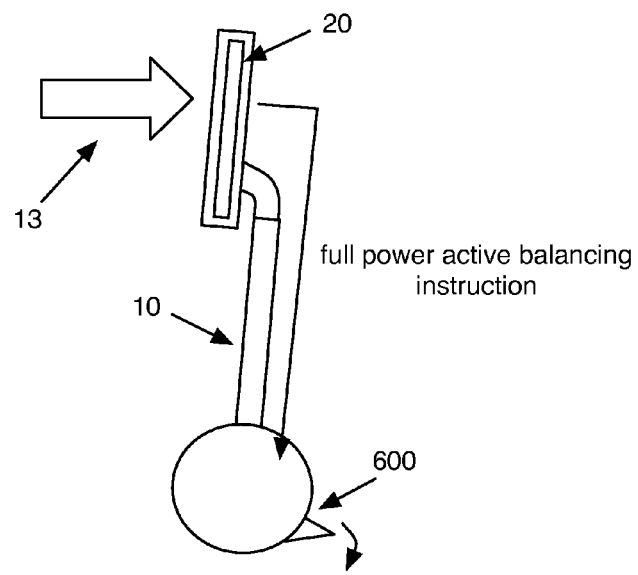
FIG. 14 is a schematic representation of a variation of robot operation in response to receipt of a destabilizing force during stand deployment.

The stand operation mode preferably influences balancing mechanism operation. In particular, the balancing mechanism 400 is preferably shut off or operating in a decreased response mode (e.g., standby mode) when the stand 600 is extended, and is preferably operating in an active balancing mode when the stand 600 is retracted. This preferably functions to decrease the power consumed by the balancing mechanism 400, and can also function to reduce damage to the stand 600 due to balancing mechanism 400 or drive mechanism operation (e.g., driving the robot 10 while the stand 600 is deployed could result in stand 600 damage). Balancing mechanism operation mode adjustment is preferably performed concurrently with stand operation mode adjustment, but can alternatively be performed sequentially. The balancing mechanism 400 can additionally accommodate for imbalances during the transition between the extended and retracted modes. For example, the active balancing applied by the balancing mechanism 400 can be gradually decreased or increased (e.g., powered down or powered up, respectively) during stand 600 extension or retraction, respectively, but can be operated in the full power mode in response to detection of a destabilizing force 13 applied to the robot 10 (e.g., application of a force that results in a drive base 100 or support torque greater than a threshold torque or acceleration), as shown in FIG. 14.

Extending the kickstand can include extending the stand 600 and shutting off the balancing mechanism 400 in response to full stand 600 deployment. For example, the robot 10 can be actively balanced until the stand 600 is deployed, at which point active balancing is decreased or shut off. Alternatively, extending the kickstand can include decreasing the sensitivity, power, or any other suitable control variable of the balancing mechanism 400 while extending the stand 600. For example, the active balancing can be less responsive as the stand 600 extends further from the retracted position. Alternatively, extending the kickstand can include shutting off the balancing mechanism 400, then deploying the stand 600. However, balancing mechanism operation and kickstand extension can be cooperatively controlled in any other suitable manner.

Retracting the kickstand can include turning on the balancing mechanism 400 and retracting the stand 600 in response to full balancing mechanism operation. For example, the robot 10 can be supported by the stand 600 until the robot 10 is actively balanced, at which point the stand 600 is retracted. Alternatively, retracting the kickstand can include increasing the sensitivity, power, or any other suitable control variable of the balancing mechanism 400 while retracting the stand 600. Alternatively, retracting the kickstand can include retracting the stand 600, then turning on the balancing mechanism 400. However, balancing mechanism operation and kickstand retraction can be cooperatively controlled in any other suitable manner.

As shown in FIG. 3, the robot 10 preferably additionally includes a power source 170 that functions to store and supply power to the drive mechanism 130 and/or balancing mechanism 400. However, the robot components can alternatively be powered by the power source 170 of the mobile device. The power source 170 can additionally power the retained device 20, the auxiliary devices, or any other suitable active component of the robot 10. The power source 170 is can be connected to the head 300, more preferably the retained device 20, through the device connector 350, but can be otherwise connected to the retained device 20. The power source 170 is preferably arranged within and supported by the drive base 100, but can alternatively be supported by the support 200 or located within the head 300. The power source 170 is preferably arranged between the first and second wheel 110, but can alternatively be arranged in any other suitable position. The power source 170 preferably includes one or more secondary cells (e.g., rechargeable cells, such as lithium chemistry cells), but can alternatively include one or more primary cells or a combination thereof. The cells are preferably connected in parallel, but can alternatively be connected in series or a combination thereof.

Figure 15:
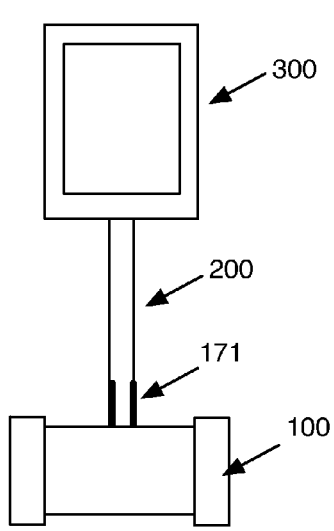
FIGS. 15, 16, and 17 are schematic representations of a first, second, and third variation of electrode placement, respectively.
Figure 16:
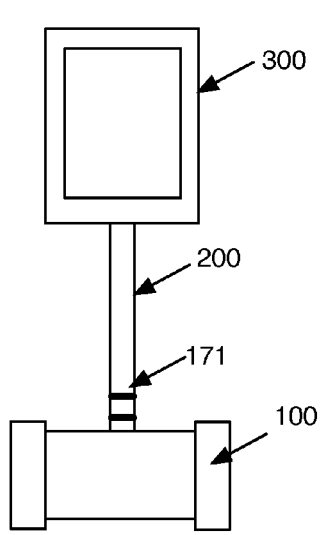
Figure 17:
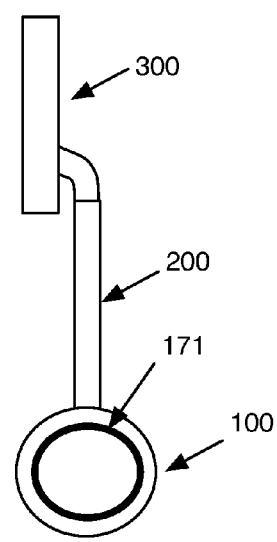

The power source 170 preferably includes a first and second charging lead electrically connected to a first and second power terminal of the power source 170 (e.g., positive and negative power terminal, respectively) and terminating in a first and second electrode (e.g., charging connector), respectively. The electrodes 171 are preferably arranged on the support 200, but can alternatively be arranged on the drive base 100, wheels 110, or head. In one variation of the robot 10 as shown in FIG. 15, the first and second electrode are arranged on the support 200 with the broad faces of the electrodes 171 extending along opposing sides of the support 200 parallel the longitudinal axis of the support 200. In another variation of the robot 10 as shown in FIG. 16, the first and second electrodes 171 are rings aligned along the longitudinal axis of the support 200. In another variation of the robot 10 as shown in FIG. 17, the first and second electrodes 171 are the hubs of the first and second wheels 110, respectively. In another variation of the robot 10, the first and second electrodes 171 are connectors (e.g., profiled or flush) on the surface of a drive base 100 casing enclosing the power source 170. However, the first and second electrical contacts can be otherwise arranged.

The robot 10 preferably additionally includes a navigation mechanism 500 that functions to supply navigation information to the retained device 20. More preferably, the navigation mechanism 500 transfers ambient environment data to the retained device 20. The navigation mechanism 500 preferably assists the retained device 20 in determining obstacles in the path of the drive base 100 (e.g., in the direction of robot motion). A navigation mechanism 500 can be particularly desirable because the robot 10 relies on mobile device components for environmental data input (e.g., the camera), but the robot 10 retains the mobile device at a position far enough from the drive base 100 that the environmental data device is incapable of providing data about the environment immediately adjacent drive base, which can be desirable for navigation purposes.

In one variation of the robot 10, the navigation mechanism 500 directs an image of an area adjacent the drive base 100 to the retained device 20. The area of the drive base 100 preferably includes an area normal to the first broad face of the retained device 20, but can alternatively include an area normal to the second broad face of the retained device 20, an area at an angle to either the first or second broad faces, an area normal to the axis of rotation of the wheels no, or be any other suitable area. The navigation mechanism 500 preferably includes a mirror 510 that redirects an image of an area adjacent the drive base 100 to a camera of the mobile device, as shown in FIG. 6B, but can alternatively or additionally include an auxiliary camera angled with the area adjacent the drive base 100 within the field of view, or include any other suitable image redirection or capture mechanism. The mirror is preferably coupled to the second broad face of the device retention mechanism 310, adjacent the cutout for the back-facing camera. Alternatively, the mirror can be arranged such that the mirror directs an image of the area adjacent the drive base 100 to the front-facing camera 25. The mirror preferably extends at an angle toward an edge of the device retention mechanism 310 from a point opposing the edge defining the camera cutout, wherein the edge is preferably the device retention mechanism 310 edge adjacent the support interface 330 (e.g., the mirror is preferably angled downward, toward an area adjacent the drive base 100). The mirror can be arranged adjacent the lateral edge of the device retention mechanism 310 adjacent the support interface 330, but can alternatively be arranged along any other suitable edge. The mirror is preferably a plane mirror, but can alternatively be a convex mirror, concave mirror, a mirror with a filter, or any other suitable mirror. The mirror can additionally include an attachment mechanism that transiently retains a mirror attachment that changes a light parameter reflected off the mirror, such as a lens or filter. The mirror can be substantially static relative to the head 300, or can articulate and be driven by a motor or be manually adjusted. In operation, the mirror reflects an image of an area adjacent the drive base 100 to a camera (preferably the back-facing camera but alternatively the front-facing camera 25), wherein the mobile device preferably sends the captured image or video stream to a secondary mobile device. The captured image or video stream is preferably displayed on the secondary mobile device, enabling a user controlling the robot 10 through the secondary mobile device to view and avoid obstacles in the robot 10 drive path. Alternatively, the retained device 20 can analyze the captured image or video stream to generate driving or balancing instructions 23. For example, the captured image or video stream can be analyzed for obstacles, wherein the retained device 20 preferably performs the analysis and generates navigation instructions based on the analysis. In another example, the captured image or video stream can be analyzed for faces, such as human or animal faces, wherein instructions can be generated to center the face in the field of view. The captured image or video stream can be otherwise used for navigational purposes.

In another variation of the robot 10, the navigation system includes a remote sensing mechanism that functions to map or determine the environment proximal the drive base 100. The remote sensing mechanism is preferably a Laser Imaging Detection and Ranging (LIDAR) system, but can alternatively be a radar system, a radiometer, a photometer, a simultaneous multi-spectral platform, or any other suitable remote sensing mechanism.

The LIDAR system is preferably located in a transparent section of the support 200, more preferably in a transparent section of the support 200 adjacent the drive base 100, but can alternatively be located on the device retention mechanism 310 (e.g., proximal the support interface 330 or distal the support interface 330), or located at any other suitable portion of the robot 10. The LIDAR system preferably includes a laser that illuminates a portion of the environment, optics that control the laser illumination, and photodetector electronics that receive the backscattered light for analysis. The laser preferably emits ultraviolet, visible, infrared, or near infrared light, but can alternatively emit any other suitable wavelength of electromagnetic radiation. The LIDAR system can be an incoherent LIDAR or can be a coherent LIDAR. The LIDAR system is preferably a non-scanning system, but can alternatively be a scanning system, wherein the LIDAR can additionally include a scanner. The LIDAR system is preferably substantially static, but can alternatively be rotated by a motor to achieve a larger viewing angle (e.g., a 360-degree image). The LIDAR can include or be coupled to a position and navigation system (e.g., the ones included in the mobile device). In one variation, the LIDAR system includes a plurality of lasers arranged in a ring, wherein the plane of the ring is preferably substantially perpendicular to the longitudinal axis of the pole. In one instance of the variation, the LIDAR system includes two or more (e.g., three) 120-degree line lasers adjacently arranged in a circle, such that the combined range of the lasers substantially covers a 360-degree area. The line lasers are preferably directed radially outward from the longitudinal axis of the pole. The LIDAR system preferably additionally includes a camera directed toward a 360-degree mirror, more preferably a 360-degree conical mirror (e.g., with the apex proximal the camera, but alternatively distal from the camera). The camera preferably is on the same side of the lasers as the mirror, wherein the camera is proximal the lasers, but can alternatively oppose the 360-degree mirror across the line lasers. The camera is preferably arranged approximately an inch away from the lasers, but can alternatively be arranged any suitable distance away from the lasers. The mirror is preferably arranged more than an inch away from the lasers, but can alternatively be arranged any suitable distance away from the lasers. However, any other suitable LIDAR system can be used.

In another variation of the robot 10, the navigation mechanism 500 includes a force feedback sensor, wherein the robot 10 empirically determines the obstacles in the drive path. In operation, the robot 10 runs into the obstacle, wherein the force feedback sensor notifies the processor (e.g., mobile device) that an obstacle has been encountered. The robot 10 driving instructions are preferably altered to avoid the encountered obstacle. The obstacle location can additionally be saved and mapped to a virtual map of the robot 10 environment. However, the robot 10 can include any other suitable navigation mechanism 500.

In another variation of the robot 10, the navigation mechanism 500 includes a map-based navigation mechanism 500, wherein the retained device 20 generates navigation instructions (e.g., drive instructions) based on the retained device 20 geographical location and a map of the environment. The device geographical location can be determined from a position sensor of the retained device 20 (e.g., GPS, WiFi triangulation, etc.), determined from the tracked distance and direction traveled, or determined in any other suitable manner. The map of the environment can be a predetermined map, such as a pre-loaded map of the environment or a map received from a remote server, a map generated by the mobile device, or any other suitable map. However, the robot 10 can include sound-based navigation mechanism 500s (e.g., sonar), light-based navigation systems (e.g., lasers), or any other suitable navigation mechanism 500.

The robot 10 can additionally include one or more auxiliary devices that add functionality to the retained device 20. The auxiliary devices can be arranged within the head 300, the support 200, and/or the base. The auxiliary device can be an output, such as a second screen, light emitting element, speaker, or any other suitable data output. Alternatively, the auxiliary device can be an input, such as a keyboard, microphone, touchscreen, sensor (e.g., proximity sensor, motion sensor, etc.), or any other suitable data input. The auxiliary device preferably electronically connects to the retained device 20, but can alternatively connect to a primary processor 150 of the robot 10. The auxiliary device is preferably electrically connected to the retained device 20 and exchange and/or transmit data and/or power through the auxiliary device connector, but can alternatively be electrically connected to the retained device 20 through the primary processor 150, wherein the primary processor 150 functions as an intermediary between the auxiliary device and the retained device 20, be connected to an auxiliary mobile device port, or be connected to the retained device 20 in any other suitable manner. The auxiliary device is preferably powered by the retained device 20, but can alternatively be electrically connected to and powered by the power source 170 of the drive base 100, be powered by a secondary power source 170, or be powered by any other suitable power source 170. The auxiliary device is preferably controlled by the retained device 20, but can alternatively be controlled by the primary processor 150 within the robot 10 (e.g., within the drive base 100, within the head 300, or within the support 200), be controlled by the second device 30, or be controlled in any other suitable manner.

The robot 10 can additionally include one or more accessory components 700 that increase the functionality of the robot 10. In one variation, the robot 10 can include an arm extending from the support 200, base, or head. The arm is preferably acutatable, but can alternatively be static. The arm is preferably controlled by the retained device 20, but can alternatively be controlled based on auxiliary instructions 38 received from the second device 30, signals generated by the primary controller, or any other suitable signals. The arm can include a single member, a first and second member joined by a joint, or any other suitable number of sections. The arm is preferably mounted to the robot 10, but can alternatively be removable. However, any other suitable accessories can be included.

2. Method.

In operation, a method of operating the retained device includes determining a connection with the robot S100; determining a device position relative to a reference S200; determining that a device position falls outside a predetermined position range S300; automatically generating orientation control instructions for the robot to bring the mobile computing device position parameter within the predetermined position range S400; sending the orientation control instructions to the robot S500; receiving a set of driving instructions from a second device S600; and sending the driving control instructions to the robot S700. The method is preferably performed by the retained device as described above, but can alternatively be performed with the robot described above or with any other suitable computing device. The method is preferably implemented by an application executed on the device, but can alternatively be implemented by a web-based browser or any other suitable set of control instructions.

Figure 18:
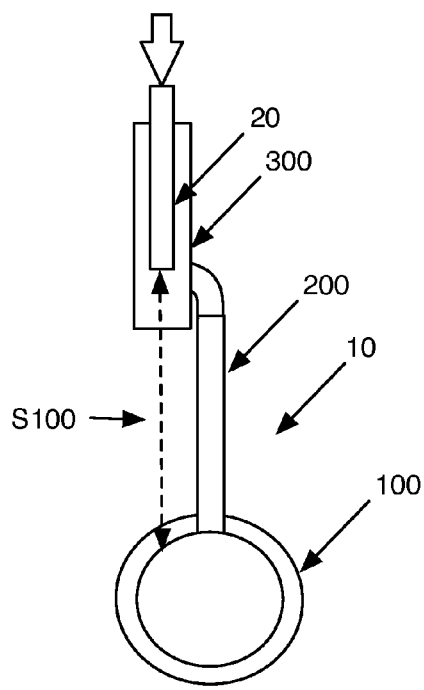
FIG. 18 is a schematic representation of a variation of detecting a connection with the robot.

Determining a connection with the robot S100, as shown in FIG. 18, functions to determine when the method should be performed. The device preferably detects a physical connection with the robot, but can alternatively detect a data connection with the robot (e.g., connect to the robot via Bluetooth, etc.), a power connection with the robot, or any other suitable connection with the robot. Alternatively, the device can detect a robot identifier, such as via a NFC or RFID signal. The device preferably detects connection with the drive base (e.g., detect head connection with the support), but can alternatively detect connection with the support or head.

Determining the connection with the robot can additionally function to select an operation mode for the portable device. In one variation, the orientation in which the retained device is coupled to the robot determines the operation mode of the portable device. More preferably, the orientation of device coupling to the robot determines which wheel rotation direction is mapped to a forward drive instruction and which wheel rotation direction is mapped to a backward drive instruction. For example, the retained device can be operable between a first mode, wherein a forward instruction is mapped to robot movement in a direction normal to the back face of the device, and a second mode, wherein a forward instruction is mapped to robot movement in a direction normal to the display or front face of the device. The first mode can be used in response to device coupling to the robot with the front or back camera proximal the drive base (as shown in FIGS. 19 A and 19B), and the second mode used in response to device coupling to the robot with the front or back camera distal the drive base (as shown in FIGS. 20A and 20B). However, any suitable operation modes with any other suitable characteristics can be selected in response to the retained device orientation relative to the drive base. Alternatively, the robot operation mode can be agnostic to the retained device orientation, wherein the robot operation mode can be predetermined or determined by the second device.

Determining a device position relative to a reference S200 functions to determine whether the retained device and/or robot is balanced. The device position is preferably determined relative to a reference position, more preferably a reference vector (as shown in FIG. 21A), such as a gravity vector or a vector intersecting a point of wheel contact with the drive surface and the rotational axis of the wheel but can alternatively be any other suitable reference point. The device position is preferably determined based on orientation sensor measurements, but can alternatively be determined using any other suitable position determination mechanism. Alternatively, a retained device translation parameter, such as the acceleration or velocity of the retained device can be determined. The angular position of the retained device relative to a gravity vector or a vector intersecting a point of wheel contact with the driving surface and the rotational axis of the wheel is preferably measured, but the acceleration or velocity of the retained device along a gravity vector (e.g., toward the drive base) or any other suitable measurement indicative of retained device balance can alternatively be measured. The retained device position parameter is preferably determined based on measurements from position sensors of the retained device (e.g., the accelerometer, gyroscope, GPS, etc.), but can alternatively be determined based on position sensors of the robot, the video or image captured by a camera of the retained device, the video or image captured by a camera of the robot, or determined in any other suitable manner. When the position is determined from an image or video, the image or video can be analyzed to track object movement between frames, identify the proportion of the ground within the image, or analyzed to extract any other suitable information indicative of the position or motion of the retained device. However, any other suitable method of determining whether the robot and/or retained device is balanced can be used.

Determining that a retained device position parameter falls outside a predetermined position range S300 functions to identify a trigger event to re-balance the robot. Determining that the device position parameter falls outside the predetermined position range preferably includes comparing the measured device position with the predetermined position range. Determining that the retained device position falls outside the predetermined position range can additionally include selecting a position range. The position range is preferably an angular range (e.g., as shown in FIG. 21A), but can alternately be a distance range (e.g., in a direction normal to the gravity vector), a velocity range, and acceleration range, or any other suitable range of positions or position related parameters. The position range can be set (e.g., set by the manufacturer, factory, or user), or can be dynamically (e.g., automatically) determined. In one variation of the method, determining the position range includes selecting the position range based on the speed or acceleration of the device or robot. For example, the position range can be increased in the drive direction in response to the robot or device velocity or acceleration exceeding a threshold velocity or acceleration and decreased in response to the velocity or acceleration falling below the threshold. In another example, the position range can be selected based on the wheel rotational speed (e.g., as determined by an encoder). In another variation of the method, the position range can be selected based on the ambient environment. For example, a first position range can be selected when the robot is driving on an incline above a threshold incline (e.g., more than 2 degrees), a second range can be selected when the robot is driving on a substantially flat surface (e.g., having an incline below 1 degree), and a third range can be selected when the robot is driving on a decline above a threshold decline (e.g., more than 5 degrees). In another variation of the method, the position range can be selected based on the substantially instantaneous geographic location of the retained device wherein a first range can be selected for a first venue and a second range selected for a second venue different from the first. In another variation of the method, the position range can be selected based on the experience level of the user (e.g., user account) controlling the second device. The experience can be determined from the number of use hours, the control instructions received after a destabilizing event (e.g., wherein the destabilizing event is detected and the second user response resulted in a positive outcome), the control permissions associated with the user account, learned position preferences, or determined in any other suitable manner. A first range is preferably selected for users having a first experience level, and a second range selected for users having a second experience level higher than the first. Any suitable number of ranges can be determined for any suitable number of experience levels. The second range is preferably larger (e.g., includes a wider range of positions), but can alternatively be smaller and centered about a different vector relative to the reference vector, or have any other suitable characteristic relative to the first range. In another variation of the method, the second range can be determined based on tilt control instructions received from the second device. The tilt control instructions can include a desired position range that can be subsequently set as the predetermined position range, a desired experience setting that corresponds with a predetermined position range, or any other suitable position range selection. However, the position range can be determined using any combination of the aforementioned variations, or determined in any other suitable manner.

Automatically generating orientation control instructions for the robot to bring the device position within the predetermined position range S400, as shown in FIG. 21A, functions to rebalance the robot. The balancing instructions (orientation control instructions) are preferably generated in response to determining that the retained device position is outside of the predetermined position range. However, the balancing instructions can be generated in response to any other suitable trigger event. The instructions are preferably generated by the retained device, but can alternatively be generated by the robot or the second device. The instructions preferably include machine-level instructions, such as how much power should be provided to an electric motor, what the rotational speed of the wheel or motor should be (e.g., a target speed), or any other suitable machine-level instruction, wherein the balancing mechanism receives and operates based on the machine-level instructions. However, the instructions can additionally or alternatively include system-level instructions, such as what the target position is and what the current position is, the distance to move the robot, the time in which the robot should be moved, or any other suitable system-level instructions, wherein the primary controller of the robot receives the system-level instructions and generates machine-level instructions for the balancing mechanism. However, any other suitable type of instruction can be generated, and any other suitable component can process and control the balancing mechanism to balance the robot.

Sending the orientation control instructions to the robot S500, as shown in FIG. 21A, functions to communicate the balancing instructions to the balancing mechanism. The balancing mechanism preferably subsequently balances the robot S510 based on the balancing instructions, as shown in FIGS. 21A and 21B. The balancing instructions are preferably sent by the retained device to the robot, but can alternatively be sent by the second device to the robot (e.g., in variations where the second device generates the balancing instructions). In the latter variation, the balancing instructions are preferably relayed through the retained device, but can alternatively be directly sent to the balancing mechanism. Sending the balancing instructions preferably includes transferring the balancing instructions over a wired connection, but can alternatively include transmitting the balancing instructions over a wireless connection to the robot (e.g., via Bluetooth, inductive communication, NFC, light patterns, radio, or any other suitable short-range wireless communication technology) or transmitting the balancing instructions to a router (e.g., a wireless router or a remote server), which subsequently transmits the balancing instructions to the robot. However, the balancing instructions can be otherwise communicated to the robot. The balancing instructions are preferably transmitted (e.g., communicated) to the primary controller, but can alternatively be transmitted directly to the balancing mechanism. The primary controller preferably subsequently transfers the balancing instructions to the balancing mechanism (e.g., the motor controllers). The primary controller can additionally process the balancing instructions into machine-level instructions.

In a first variation of the method, the retained device directly transfers the balancing instructions over a data connector connecting the retained device to the primary controller or balancing mechanism. In another variation of the method, the retained device transfers the data over a wired connection to the head, wherein the head wirelessly transfers the data to the primary controller or balancing mechanism. In another variation of the method, the retained device transfers the balancing instructions directly to the primary controller or balancing mechanism over a wireless connection. The wireless connection is preferably a short-range communication mechanism, but can alternatively be a long-range communication mechanism. In another variation of the method, the retained device wirelessly communicates the balancing instructions to the head, wherein the head communicates the balancing instructions to the primary controller or balancing mechanism. However, the balancing instructions can be transferred from the retained device to the balancing mechanism using any combination of the aforementioned variations, or transferred in any other suitable manner.

Receiving a set of driving instructions from a second device S600, as shown in FIG. 2 functions to allow a second user, more preferably a remote user, to navigate the robot about a geographic location. The set of driving instructions is preferably generated and communicated by the second device to a remote server, wherein the remote server communicates the driving instructions to the retained device. However, the set of driving instructions can be directly communicated to the retained device. The driving instructions can include system-level instructions, such as a direction of travel (e.g., forward, backward, to the left or to the right), a target speed, a target acceleration, a target position range, a target geographic location, or any other suitable system-level instruction. Alternatively or additionally, the driving instructions can include machine-level instructions, such as a target wheel or motor rotational speed, wheel rotation direction, or any other suitable driving instruction.

Figure 22:
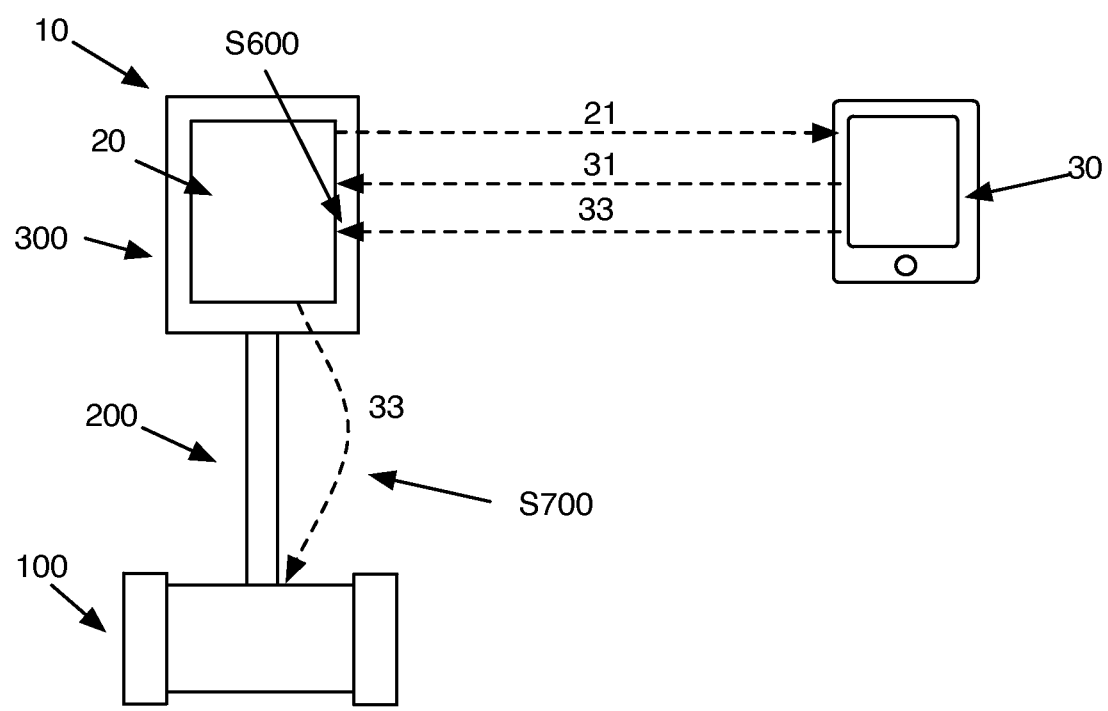
FIG. 22 is a schematic representation of a variation of robot operation in response to receipt of control instructions from a second device

Receiving a set of driving instructions from a second device preferably additionally includes collecting ambient environment data and sending the ambient environment data to the second device, as shown in FIG. 22. The ambient environment data preferably includes the image or video captured by the retained device (e.g., video of an area normal to the display of the retained device), and can additionally include audio captured by the retained device. The ambient environment data can additionally include an image or video of an area proximal the drive base. The area is preferably in a direction normal the display of the retained device, but can alternatively be in a direction normal the opposing face of the retained device (e.g., back face). However, any other suitable ambient environment data (e.g., temperature, identified obstacles, etc.) using can be measured and sent to the second device, preferably through the retained device but alternatively directly. The ambient environment data is preferably captured by a navigation mechanism of the robot, but can alternatively or additionally be captured by a second camera of the retained device or otherwise captured. The ambient environment data is preferably received by the second device, and can additionally be displayed on the second device to the user. For example, the image or video captured by the first camera can be displayed on the majority of a display of the second device, while the image or video captured by the second camera can be displayed on a small insert on the display of the second device. Alternatively, the second device can selectively display the ambient environment data (e.g., only display data received from the front camera but not display data received from sensors), or not display any ambient environment data.

Receiving the set of driving instructions can additionally include generating secondary driving instructions based on the ambient environment data. The secondary driving instructions are preferably automatically generated by the retained device, but can alternatively be automatically generated by the second device, the primary controller, a remote server, or any other suitable component. The secondary driving instructions preferably supplement the driving instructions received from the second device (e.g., used to refine the primary driving instructions), but can alternatively be used in lieu of the primary driving instructions. The latter case can be used when the number of adverse events (e.g., detection of a force opposing robot motion in a direction) exceeds a threshold number, when the second device sends an automatic drive instruction, or in response to any other suitable automatic drive event. In one example, the retained device can automatically determine obstacles in the drive path and avoid the identified obstacles. In another example, the retained device can analyze a video to identify and follow a person or another subject.

Receiving driving instructions from the second device can additionally include generating driving control instructions for the robot, wherein the retained device processes the driving instructions received from the second device or the secondary driving instructions into system-level or machine-level instructions for the robot. For example, the retained device can process a forward drive instruction from the second device into motor instructions including the motor rotation speed and direction. However, any other suitable driving control instructions can be generated based on the driving instructions received from the second device.

Sending the drive instructions to the robot S700, as shown in FIG. 22, functions to control the robot according to the drive instructions. The drive instructions are preferably sent by the retained device to the robot, but can alternatively be sent by a remote server or the second device to the robot. The drive instructions are preferably received by the primary processor, but can alternatively be received by the drive mechanism or any other suitable component. The drive instructions are preferably sent to the robot after receipt from the second device, but can alternatively be sent after processing the received drive instructions (wherein the processed drive instructions are sent to the robot), or after any other suitable event has occurred. In response to drive instruction receipt, the robot preferably controls the drive mechanism to translate the robot according to the drive instructions.

The method can additionally include receiving extension instructions (height adjustment instructions) from the second device. The extension instructions are preferably received by the retained device, wherein the retained device sends the extension instructions (processed or as received) to the extension mechanism, which subsequently controls the support drive components based on the extension instructions. However, the extension instructions can be received by the primary processor or extension mechanism. Alternatively, the extension instructions can be automatically generated by the retained device or a remote device (e.g., to center a camera focus on a given subject). However, the support can be otherwise controlled.

The method can additionally include receiving auxiliary instructions from the second device for remote auxiliary component control, as shown in FIG. 4. The auxiliary instructions are preferably received by the retained device and sent as-is or post-processed to the robot, wherein the robot subsequently controls the auxiliary component. Alternatively, the retained device can directly control the auxiliary component based on the auxiliary instructions. In one example of the method, the retained device can receive an arm extension instruction and control an auxiliary arm of the robot to extend, and receive an arm retraction instruction and control the auxiliary arm to retract. However, any other suitable auxiliary instructions can be received.

The method can additionally include receiving a second audio and video stream from the second device, displaying the second video stream on the retained device, and playing the second audio stream on the retained device, as shown in FIG. 22. The second audio and video stream is preferably recorded and sent by the second device, but can alternatively be streamed from a remote server or otherwise generated and sent to the retained device. The method can additionally include verifying access permissions for the second device or a user account associated with the second device at the retained device. The method can additionally include automatically deploying the stand or deploying the stand in response to deploy instructions received from the second device, as described above. However, the method can additionally include any other suitable functionality to be performed by the retained device, second device, or robot components.

As a person skilled in the art will recognize from the previous detailed description and from the figures and claims, modifications and changes can be made to the preferred embodiments of the invention without departing from the scope of this invention defined in the following claims.

We claim:

1. A robot controllable by a portable device, the robot comprising:
   a support comprising an extendable member configured to automatically adjust a length of the support in response to height instructions received from the portable device, and thereby adjust a vertical position of a center of mass of the robot during operation;
   a base mounted to the support, the base comprising:
      a first wheel coaxially aligned with a second wheel along an axis;
      a first motor, drivably coupled to the first and second wheel; and
      a processor configured to balance the robot by maintaining a position of a vector, extending between the center of mass and the axis within a predetermined range of positions relative to a gravity vector, based on accelerometer data, received from and generated by the portable device, and vertical position data determined from the support, wherein vertical position data comprises the vertical position of the center of mass of the robot during operation.

2. The robot of claim 1, further comprising a head removably mounted to the support distal the base, the head configured to transiently retain the portable device.

3. The robot of claim 2, wherein the head comprises a device retention frame configured to retain two opposing edges of the portable device.

4. The robot of claim 1, further comprising a kickstand comprising a first end and a second end, wherein the first end is rotatably mounted to the base between the first and second wheels, wherein the kickstand is operable between an extended mode and a retracted mode, wherein the second end is adjacent the base in the retracted mode and distal the base in the extended mode.

5. The robot of claim 1, further comprising an imaging device configured to supply imaging data to the portable device.

6. The robot of claim 5, wherein the imaging device is mounted to a head removably mounted to the support, distal the base, the head configured to transiently retain the portable device.

7. The robot of claim 6, wherein the imaging device comprises a lens configured to supply an image to a first camera of the portable device, the lens having a field of view normal to a display of the portable device.

8. The robot of claim 7, wherein the imaging device comprises a mirror configured to form an image of an area proximal the base of the robot at a second camera of the portable device.

9. The robot of claim 1, further comprising a wireless data link configured to communicate instructions between the portable device and the processor.

10. The robot of claim 1, further comprising a wire extending along a length of the support, electrically connecting the portable device to the base.

11. The robot of claim 10, wherein the wire comprises a data and power transfer wire, wherein the base further comprises a power storage mechanism electrically connected to the data and power transfer wire.

12. The robot of claim 1, the extendable member further comprising a second motor, configured to control extendable member extension, that is controlled by at least one of the portable device and the processor.

13. The robot of claim 12, wherein the extendable member comprises a telescoping linear actuator driven by the motor.

14. The robot of claim 13, further comprising a communication wire extending through a lumen defined within and extending along a longitudinal axis of the telescoping linear actuator.

* * * * *